(12) United States Patent
Henry et al.

(10) Patent No.: US 9,334,778 B2
(45) Date of Patent: May 10, 2016

(54) SOLID AMMONIA DELIVERY SYSTEM

(71) Applicant: Cummins IP, Inc., Minneapolis, MN (US)

(72) Inventors: Cary J. Henry, Columbus, IN (US); Michael J. Ruth, Franklin, IN (US)

(73) Assignee: CUMMINS IP, INC., Columbus, IN (US)

( * ) Notice: Subject to any disclaimer, the term of this patent is extended or adjusted under 35 U.S.C. 154(b) by 0 days.

(21) Appl. No.: 14/199,426

(22) Filed: Mar. 6, 2014

(65) Prior Publication Data

US 2014/0250866 A1    Sep. 11, 2014

Related U.S. Application Data

(60) Provisional application No. 61/774,429, filed on Mar. 7, 2013.

(51) Int. Cl.
*F01N 3/18* (2006.01)
*F01N 3/20* (2006.01)

(52) U.S. Cl.
CPC .............. *F01N 3/208* (2013.01); *F01N 3/2066* (2013.01); *F01N 2240/25* (2013.01); *F01N 2610/10* (2013.01); *F01N 2610/12* (2013.01); *Y02T 10/24* (2013.01)

(58) Field of Classification Search
CPC ............ F01N 2240/25; F01N 2610/10; F01N 2610/105; F01N 2610/12
See application file for complete search history.

(56) References Cited

U.S. PATENT DOCUMENTS

| 8,088,201 B2 | 1/2012 | Johannessen | |
| 2010/0086467 A1* | 4/2010 | Johansen et al. | 423/352 |
| 2014/0109657 A1* | 4/2014 | Audouin | 73/61.78 |

FOREIGN PATENT DOCUMENTS

| EP | 1 977 817 B1 | 11/2010 |
| EP | 1 992 397 B1 | 9/2011 |
| EP | 2 455 338 A1 | 5/2012 |
| EP | 2538051 A1 * | 12/2012 |
| WO | WO2011/113454 A1 | 9/2011 |

* cited by examiner

*Primary Examiner* — Jonathan Matthias
(74) *Attorney, Agent, or Firm* — Foley & Lardner LLP

(57) ABSTRACT

Systems and methods for generating and controlling generation of ammonia. The ammonia generation control system includes a communication module and an ammonia generation module coupled to the communication module. The ammonia generation module is configured to cause generation of gaseous ammonia from a solid ammonia source in response to a determination that an ammonia storage quantity in an ammonia dosing storage cartridge meets a first pre-determined threshold and a determination that an engine condition of an internal combustion engine coupled to ammonia dosing storage cartridge meets a pre-determined engine condition threshold.

18 Claims, 3 Drawing Sheets

SOLID AMMONIA DELIVERY SYSTEM

CROSS-REFERENCE TO RELATED APPLICATIONS

The present application claims priority to U.S. Provisional Patent Application No. 61/774,429, filed Mar. 7, 2013 and the contents of which are incorporated herein by reference in their entirety.

BACKGROUND

Emissions regulations for internal combustion engines have become more stringent over recent years. Environmental concerns have motivated the implementation of stricter emission requirements for internal combustion engines throughout much of the world. Governmental agencies, such as the Environmental Protection Agency (EPA) in the United States, carefully monitor the emission quality of engines and set acceptable emission standards, to which all engines must comply. Generally, emission requirements vary according to engine type. Emission tests for compression-ignition (diesel) engines typically monitor the release of diesel particulate matter (PM), nitrogen oxides (NOx), and unburned hydrocarbons (UHC).

Exhaust aftertreatment systems receive and treat exhaust gas generated by an internal combustion engine. Typical exhaust aftertreatment systems include any of various components configured to reduce the level of regulated exhaust emissions present in the exhaust gas. For example, some exhaust aftertreatment systems for diesel powered internal combustion engines include various components, such as a diesel oxidation catalyst (DOC), particulate matter filter or diesel particulate filter (DPF), and a selective catalytic reduction (SCR) catalyst. In some exhaust aftertreatment systems, exhaust gas first passes through the diesel oxidation catalyst, then passes through the diesel particulate filter, and subsequently passes through the SCR catalyst.

The SCR catalyst in an exhaust aftertreatment system reduces the amount of nitrogen oxides (NOx) present in the exhaust gas. Generally, the SCR catalyst is configured to reduce NOx into constituents, such as $N_2$ and $H_2O$, in the presence of ammonia ($NH_3$). Because ammonia is not a natural byproduct of the combustion process, it must be artificially introduced into the exhaust gas prior to the exhaust gas entering the SCR catalyst. Typically, ammonia is not directly injected into the exhaust gas due to safety considerations associated with the storage of gaseous ammonia. Accordingly, most conventional systems are designed to inject a liquid reductant (e.g., diesel exhaust fluid (DEF), ammonia, metal chloride salt, etc.) into the exhaust gas, which is capable of decomposing into gaseous ammonia in the presence of exhaust gas under certain conditions. The liquid reductant commonly used by conventional exhaust aftertreatment systems is DEF, which is a urea-water solution. Such SCR systems typically include a liquid reductant source and a reductant injector or doser coupled to the source and positioned upstream of the SCR catalyst. The reductant injector injects liquid reductant into a decomposition space or tube through which an exhaust gas stream flows.

Recently, due to the safety and environmental considerations associated with the storage of gaseous ammonia, some SCR system manufacturers utilize solid ammonia storage to provide the ammonia necessary for NOx reduction on the SCR catalyst. Generally, such systems include a storage cartridge storing solid ammonia and a heater for transforming the solid ammonia into a gaseous state preparatory for injection into the exhaust gas. Because solid ammonia stored in the storage cartridge is consumed once transformed into a gaseous state and injected into the exhaust gas, the solid ammonia must be replaced or replenished in order to continue the NOx reduction. Some systems require a physical replacement of an empty storage cartridge with a full storage cartridge. Rather than completely replace an empty storage cartridge, some systems, such as those employing a two stage storage system including solid ammonia in at least one cartridge of the two stage system, replenish or refill an empty or partially empty cartridge via an ammonia storage regeneration event. In such an ammonia storage regeneration event, the second stage cartridge that still contains solid ammonia may be heated to release gaseous ammonia into the empty or partially empty storage cartridge. Although both one and two or multi stage solid ammonia systems may adequately provide ammonia for NOx reduction, such systems commonly employ inefficient timing strategies or triggering events for gaseous ammonia generation (in a single stage system) and ammonia storage regeneration (in a two or multistage system). For example, some systems regenerate an ammonia storage cartridge based solely on an estimated ammonia storage level of the cartridge.

SUMMARY

Various embodiments provide systems and methods for generating and controlling generation of ammonia. In particular embodiments, an ammonia generation control system includes a communication module and an ammonia generation module coupled to the communication module. The ammonia generation module is configured to cause generation of gaseous ammonia from a solid ammonia source in response to a determination that an ammonia storage quantity in an ammonia dosing storage cartridge meets a first predetermined threshold and a determination that an engine condition of an internal combustion engine coupled to ammonia dosing storage cartridge meets a pre-determined engine condition threshold.

In particular embodiments of the ammonia generation control system, the ammonia generation module is configured to cause generation of gaseous ammonia by causing transmission of a heater control command. The ammonia generation control system may include a sensor electrically coupled to the ammonia generation module, where the sensor is configured to detect the ammonia storage quantity. In particular embodiments, the sensor detects the ammonia storage quantity by detecting a quantity of ammonia dispersed from the ammonia dosing storage cartridge. The ammonia generation control system may include a sensor electrically coupled to the ammonia generation module, where the sensor is configured to detect the engine condition threshold. The engine condition threshold includes an efficiency level of an alternator, in accordance with particular embodiments. The sensor configured to detect the engine condition threshold may include an electrical current sensor. In particular embodiments, the ammonia generation control system includes a heater electrically coupled to the ammonia generation module. The ammonia generation module is operable to activate and deactivate the heater for generation of gaseous ammonia from the solid ammonia source. The solid ammonia source is disposed in the ammonia dosing storage cartridge, in accordance with particular embodiments. In particular embodiments, the solid ammonia source is disposed in a secondary ammonia storage cartridge in fluid communication with the ammonia dosing storage cartridge. The heater may be coupled to the secondary ammonia storage cartridge. The ammonia generation control system may include a valve disposed between the ammonia dosing storage cartridge and the secondary ammonia storage cartridge, where the ammonia generation module is electrically coupled to the valve to control the flow of gaseous ammonia from the secondary ammonia storage cartridge to ammonia dosing storage cartridge.

Other various embodiments provide an ammonia generation system that includes at least one ammonia storage tank including a solid ammonia source disposed therein. The at least one ammonia storage tank includes at least one heater coupled thereto. The ammonia generation system also includes an ammonia generation module electrically coupled to the at least one heater. The ammonia generation module is configured to cause generation of gaseous ammonia from the solid ammonia source by activation of the at least one heater in response to a determination that an ammonia storage quantity in an ammonia dosing storage cartridge meets a first pre-determined threshold and a determination that an engine condition of an internal combustion engine coupled to ammonia dosing storage cartridge meets a pre-determined engine condition threshold.

In particular embodiments, the solid ammonia source is disposed in a secondary ammonia storage cartridge in fluid communication with the ammonia dosing storage cartridge. The solid ammonia source may be disposed in the ammonia dosing storage cartridge. In particular embodiments, the ammonia generation system includes a sensor electrically coupled to the ammonia generation module. The sensor is configured to detect the engine condition threshold. The engine condition threshold includes an efficiency level of an alternator coupled to the internal combustion engine, in accordance with particular embodiments.

Other embodiments provide a method of controlling ammonia generation that include receiving, by an ammonia generation module, a first determination that an ammonia storage quantity has a reached a first pre-determined threshold. The method also includes receiving, by the ammonia generation module, a second determination that an engine condition of an internal combustion engine coupled to ammonia dosing storage cartridge meets a pre-determined engine condition threshold. The method further includes causing, via the ammonia generation module, generation of gaseous ammonia from a solid ammonia source in response to the receipt of the first and second determinations.

In particular embodiments, causing the generation of gaseous ammonia includes transmitting a heater control command to a heater coupled to the solid ammonia source. The method of controlling ammonia generation may include receiving the first determination from a first sensor electrically coupled to the ammonia generation module, where the first sensor is configured to detect the ammonia storage quantity. In particular embodiments, the ammonia generation module receives the second determination from a second sensor, where the second sensor configured to detect the efficiency level of an alternator coupled to the internal combustion engine. The solid ammonia source may be disposed in a secondary ammonia storage cartridge in fluid communication with the ammonia dosing storage cartridge.

BRIEF DESCRIPTION OF THE DRAWINGS

The skilled artisan will understand that the drawings primarily are for illustrative purposes and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

The features and advantages of the inventive concepts disclosed herein will become more apparent from the detailed description set forth below when taken in conjunction with the drawings.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings.

The subject matter of the present application has been developed in response to the present state of the art. For example, according to certain embodiments of the present application, an SCR system is configured to control the generation of ammonia from a solid ammonia source, also referred to herein as regeneration of a solid ammonia storage cartridge based on the storage level of ammonia in the ammonia storage cartridge, and based on considerations for efficient and reliable operation of the engine system in concert with the storage level considerations. In this manner, the SCR system of the present application regenerates a solid ammonia storage cartridge with additional ammonia at a time or during engine operating conditions in a manner that advantageously improves efficiency and reliability of the engine system and associated components.

Figure 1:
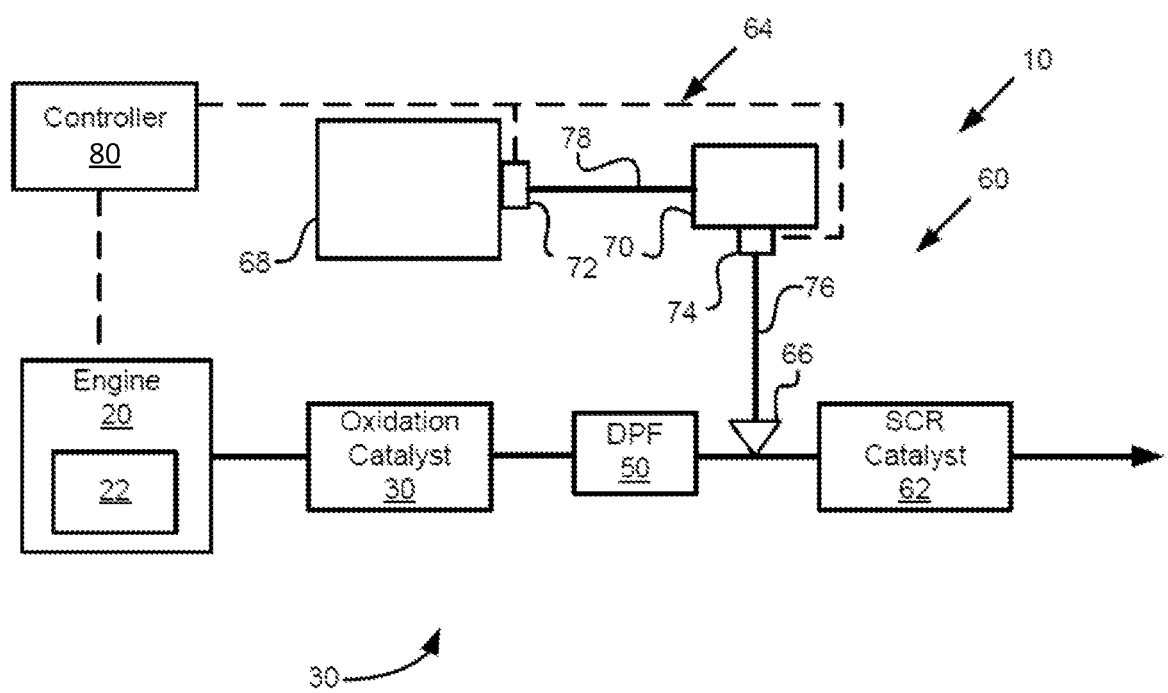
FIG. 1 is an internal combustion engine a according to one embodiment of the present disclosure.

Referring to FIG. 1, one embodiment of an internal combustion engine system 10 includes an internal combustion engine 20, an exhaust aftertreatment system 30 coupled to the engine, and a controller 80. The internal combustion engine 20 can be a compression-ignited internal combustion engine, such as a diesel fueled engine, or a spark-ignited internal combustion engine, such as a gasoline fueled engine operated lean. Within the internal combustion engine 20, air from the atmosphere is combined with fuel to power the engine. Combustion of the fuel and air produces exhaust gas that is operatively vented to an exhaust manifold. From the exhaust manifold, at least a portion of the generated exhaust gas flows into and through the exhaust gas aftertreatment system 30 via exhaust gas lines as indicated by the directional arrows intermediate the various components of the system 10. Although not shown, the engine system 10 may also include a turbocharger operatively coupled to the exhaust gas line between the engine 20 and an oxidation catalyst 40. Exhaust flowing through the turbocharger may power a turbine of the turbocharger, which drives a compressor of the turbocharger for compressing engine intake air. The engine 20 also includes one or more alternators 22 commonly used in the art. Generally, the alternator 22 is configured to convert mechanical energy generated by the engine 20 into electrical energy for powering various components of the engine. In the illustrated embodiment, the alternator 22 is electrically coupled to solid ammonia storage cartridges heaters to power the heaters, which, as is explained in more detail below, convert solid ammonia into gaseous ammonia.

Generally, the exhaust gas aftertreatment system 30 is configured to reduce the number of pollutants contained in the exhaust gas generated by the engine 20 before venting the exhaust gas into the atmosphere. As exemplary of one particular embodiment, the exhaust gas aftertreatment system 30 includes the diesel oxidation catalyst (DOC) 40, a diesel particulate filter (DPF) 50, and a selective catalytic reduction (SCR) system 60. The aftertreatment system 30 can include additional components, such as additional DOCs, DPFs, and SCR systems, or other components not shown, such as ammonia oxidation (AMOX) catalysts.

The DOC 40 can be any of various flow-through, diesel oxidation catalysts or other oxidation catalysts known in the art. Generally, the DOC 40 is configured to oxidize at least some particulate matter, e.g., the soluble organic fraction of soot, and NO in the exhaust and reduce unburned hydrocarbons and CO in the exhaust to less environmentally harmful compounds. For example, the DOC 40 may sufficiently reduce the hydrocarbon and CO concentrations in the exhaust to meet the requisite emissions standards. The exhaust aftertreatment system 30 can also include a reactant delivery system (not shown) for introducing a hydrocarbon reactant, such as fuel, into the exhaust gas prior to passing through the DOC 40. Generally, the reactant may facilitate oxidation of various chemical compounds adsorbed within the DOC 40, and effectively increase the exhaust gas temperature to facilitate active regeneration of the DPF 50 and/or an SCR catalyst 62 of the SCR system 60. Alternative, or in addition, to a reactant delivery system, the controller 80 of the engine system 10 may implement a fuel injection timing strategy for injecting fuel into the combustion chambers of the engine 20 that results in excess unburned fuel in the exhaust gas exiting the engine. The unburned fuel acts much in the same way as fuel injected externally into the exhaust gas via the reductant delivery system to provide an environment conducive to oxidation and regeneration.

The DPF 50 can be any of various particulate filters known in the art configured to reduce particulate matter concentrations, e.g., soot and ash, in the exhaust gas to meet requisite emission standards. The DPF 50 can be electrically coupled to a controller, such as the controller 80, that controls various characteristics of the particulate filter, such as, for example, the timing and duration of filter regeneration events.

In addition to the SCR catalyst 62, the SCR system 60 includes an ammonia delivery system 64. The ammonia delivery system 64 includes a gaseous ammonia doser 66, a solid ammonia source cartridge 68, and a solid ammonia dosing cartridge 70. The cartridges 68, 70, which can include canisters, containers, tanks, and the like, are configured to store ammonia in a solid state. In certain implementations, each cartridge 68, 70 includes a solid matrix made from any of various materials, such as salts (e.g., $SrCl_2$). The solid matrix is capable of adsorbing or binding to large quantities of ammonia into individual storage sites. The cartridges 68, 70 can be heated to a sufficient temperature to break the bonds between the ammonia and solid matrix to release the ammonia in a gaseous state from the storage sites in the matrix. In a reverse process, defined herein as ammonia storage regeneration, gaseous ammonia can be introduced back into the solid matrix to occupy the vacant storage sites and replenish the supply of ammonia stored in the matrix. To facilitate heating of the solid ammonia source cartridge 68 and the solid ammonia dosing cartridge 70, each cartridge includes a respective at least one heater 72, 74 operable in heat supplying communication with the corresponding cartridge. In some implementations, one or both of the heaters 72, 74 each includes two or more separately controllable heaters to provide more precise control of the heat applied to the cartridges.

Generally, the controller 80 activates the heater 74 to heat the dosing cartridge 70, and release or generate gaseous ammonia from the cartridge. The gaseous ammonia is then delivered to the ammonia doser 66 via an ammonia dosing line. The ammonia doser 66 is controllable to inject the gaseous ammonia into the exhaust gas flowing through the exhaust gas aftertreatment system 30.

According to certain operating conditions, as will be explained in more detail below, the ammonia released from the dosing cartridge 70 and injected into the exhaust gas is replaced with fresh ammonia from the storage cartridge 68 during an ammonia regeneration event. The ammonia regeneration of the dosing cartridge 70 is initiated by the controller 80, which activates the heater 72 to heat the source cartridge 68, and release or generate gaseous ammonia from the cartridge. The gaseous ammonia from the source cartridge 68 is delivered to the dosing cartridge 70 via an ammonia regeneration line 78, and bonds to the solid matrix of the dosing cartridge to replenish or regenerate the dosing cartridge with ammonia.

In various embodiments, the ammonia regeneration system 60 may be implemented with a dual solid ammonia cartridge system. In such embodiments, the solid ammonia source cartridge 68 is larger, or has a higher ammonia storage capacity, than the solid ammonia dosing cartridge 70. In some implementations, the ammonia storage capacity of the source cartridge 68 is between about 40% and about 90% higher than that of the dosing cartridge 70. The basic principle behind the dual solid ammonia cartridge approach is to equip the dosing cartridge 70 with a smaller, more efficient, and more responsive heater 74 that may consume less power compared to the heater 72 of the source cartridge 68. Such an arrangement is beneficial because the smaller dosing cartridge 70 is not only heated more frequently than the larger source cartridge 68, but because of the smaller capacity of the dosing cartridge 70, the dosing cartridge heats up faster for improved responsiveness. In other words, the source cartridge 68 generates gaseous ammonia to refill the dosing cartridge 70 at a lower frequency, and the dosing cartridge 70 generates gaseous ammonia to dose into the exhaust gas at a higher frequency, where precision and responsiveness is desired.

The ammonia doser 66 is positioned upstream of the SCR catalyst 62 to inject ammonia into the exhaust gas upstream of the SCR catalyst. The injected ammonia in the exhaust gas enters the SCR catalyst 62, interacts with an SCR washcoat of the catalyst, and facilitates the conversion of NOx into less harmful constituents. The SCR washcoat can be made from any of various catalytic materials know for reducing NOx in the presence of ammonia, such as zeolites (e.g., Cu-zeolite or Fe-zeolite), or various catalytic elements, such as V, Cr, Mn, Fe, Co, Ni, Cu, Zn, Mo, Ag, Ge, and Nb. In some implementations, carrier materials, such as $TiO_2$, $Al_2O_3$, $SiO_2$, $ZrO_2$, $GaO_2$, $TiO_2$—$Al_2O_3$, $TiO_2$—$SiO_2$, $TiO_2$—$GaO_2$, $TiO_2$—$ZrO_2$, $CeO_2$, $CeO_2$—$ZrO_2$, $Al_2O_3$—$SiO_2$, $Al_2O_3$—$ZrO_2$, $TiO_2$—$SiO_2$—$ZrO_2$, and $TiO_2$—$Al_2O_3$—$SiO_2$, may be incorporated into the washcoat to help facilitate the catalytic process for reducing NOx in the exhaust gas.

Figure 2:
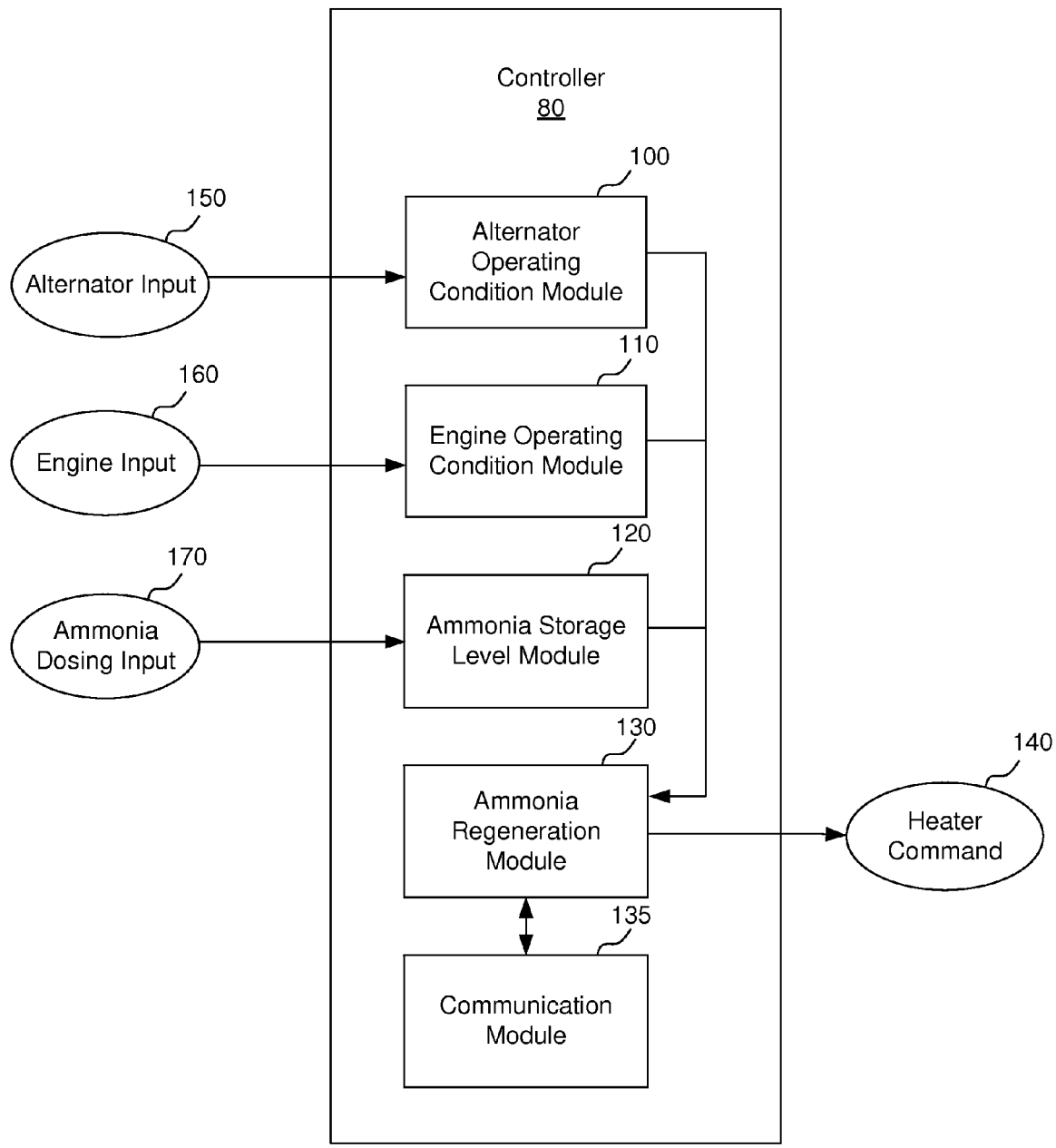
FIG. 2 illustrates a controller configured according to one embodiment of the present disclosure.

Referring to FIG. 2, the controller 80 receives one or more inputs, processes the inputs, and generates one or more outputs. Generally, the inputs are processed by the controller 80 using modules that execute various algorithms, utilize stored data, and utilize other inputs to update the stored data and/or generate output values. The generated output values can be utilized by other components or modules of the controller and/or one or more elements of the engine system 10. Although the controller 80 is shown as a single unit, in some embodiments, the controller can include several units in communication with each other, with each unit including one or more modules. Further, the units of a multi-unit controller need not be physically proximate each other, and in fact can be remote from each other, but remain in communication with each other, for example via one or more communication modules or transmitters, to execute various control commands that the module is specially configured to perform. In the illustrated embodiment, the controller 80 is located onboard a vehicle powered by the engine system 10. However, in some embodiments, the controller 80, or one or more units or modules of the controller, may be located remote from the vehicle.

In the illustrated embodiments, the controller 80 includes an alternator operating condition module 100, an engine operating mode module 110, an ammonia storage level module 120, an ammonia regeneration module 130, and a communication module 135. The modules 100, 110, 120, 130, 135 cooperate to generate a heater command 140, which controls the operation or actuation of heater 72 of the solid ammonia source cartridge 68.

The alternator operating condition module 100 is configured to determine an operating condition of the alternator based on one or more alternator inputs 150. The operating condition of the alternator can be or represent any of various conditions. In some implementations, the operating condition of the alternator is the current efficiency of the alternator, the current load of the alternator, or both. The operating condition of the alternator determined by the alternator operating condition module 100 is communicated to the ammonia regeneration module 130 for further processing.

According to implementations where the operation condition of the alternator is the current efficiency of the alternator, the alternator input 150 can be a sensed condition (e.g., detected current load of the alternator, engine speed, engine torque, powered component electrical losses (e.g., cooling fans), alternator speed, and the like), and/or an estimated or calculated condition (e.g., expected current load). The alternator input 150 may be sensed or detected via a current sensor, current transformer, or other sensor, which may be in direct electrical contact with the alternator or a wire extending directly or indirectly therefrom or may include a contactless current sensor such as a sensor including, but not limited to, a Hall effect sensor. In such implementations, the alternator operating condition module 100 may determine the current efficiency of the alternator based on a difference between the sensed load of the alternator and the expected load of the alternator. In other implementations, the alternator operating conditions module 100 determines the current efficiency of the alternator based on a predetermine relationship between the engine speed and alternator efficiency. For example, generally, the higher the engine speed, the higher the alternator efficiency. The alternator efficiency can be represented as a percentage of full efficiency of the alternator.

According to implementations where the operating condition of the alternator is the current load or output of the alternator, the alternator input 150 can be a sensed load or output of the alternator. Alternatively, the alternator input 150 can be another sensed condition of the engine system 10, or an estimated or calculated condition of the engine system.

The engine operating condition module 110 is configured to determine an operating condition of the engine based on one or more engine inputs 160. The operating condition of the engine can be or represent any of various conditions. In some implementations, the operation condition of the engine 20 is a current operating mode of the engine. The engine 20 can be operated in any of various modes, such as an extended engine motoring mode (e.g., braking or coasting), and a fueling or torque-generation mode (e.g., acceleration). Generally, when the engine 20 is combusting fuel to generate power or torque, the engine is operating in a fueling mode. In contrast, when the engine 20 is not combusting fuel, the engine is operating in the extending engine motoring mode. In some implementations, the engine inputs 160 include one or more of sensed conditions of the engine (e.g., engine speed, engine torque, fuel flow rate, brake position, and the like) and/or an estimated or calculated condition of the engine (e.g., predicted driving conditions), and the engine operating condition module 110 determines the current operating mode of the engine, such as one of an extended engine motoring mode or fueling mode, based on the one or more of the sensed or estimated conditions of the engine. The operating condition of the engine 20 (e.g., operating mode) determined by the engine operating condition module 110 is communicated to the ammonia regeneration module 130 for further processing.

The ammonia storage level module 120 is configured to determine the level of ammonia stored in the solid ammonia dosing cartridge 70. The ammonia storage level may be based on an ammonia dosing input 170. The ammonia storage level of the dosing cartridge 70 can be represented as a percentage of full ammonia storage capacity of the dosing cartridge in one embodiment. Alternatively, the ammonia storage level of the dosing cartridge 70 can be represented as a quantity of ammonia stored in the dosing cartridge in other embodiments. Generally, the ammonia storage level of the dosing cartridge 70 is dependent on the quantity of ammonia released from the dosing cartridge and injected into the exhaust gas stream for converting NOx. Accordingly, the ammonia dosing input 170 can represent a sensed or estimated quantity of ammonia released from the dosing cartridge and injected into the exhaust gas stream. The quantity of ammonia released from the dosing cartridge 170 can be based on the dosing quantity of ammonia commanded by the controller 80 for NOx reduction. Alternatively, or additionally, the quantity of ammonia released can be sensed by a physical sensor coupled to the dosing cartridge 70 and/or the dosing line 76.

In one implementation, the ammonia storage level module 120 determines the ammonia storage level of the dosing cartridge 70 by subtracting the sensed or estimated quantity of ammonia released from the dosing cartridge from a starting or baseline ammonia storage level of the dosing cartridge. The ammonia storage level module 120 can store a history of ammonia dosing input values 170 following a full ammonia regeneration event or complete replenishment of ammonia in the dosing cartridge 70. Accordingly, the ammonia storage level module 120 may keep track of the loss of ammonia from a known starting level associated with a full dosing cartridge 70. In this manner, the ammonia storage level module 120 continuously monitors the depletion of ammonia from a full dosing cartridge, as well as the current ammonia storage level of the full dosing cartridge, and resets the current ammonia storage level to a level associated with a full dosing cartridge following a completed ammonia regeneration event. The ammonia storage level of the dosing cartridge 70 determined by the ammonia storage level module 120 is communicated to the ammonia regeneration module 130 for further processing.

Although the controller 80 includes an alternator operating condition module associated with the condition of an alternator and an engine operating condition module associated with an operating mode of the engine, in other embodiments, the controller 80 can include any of various engine condition modules associated with any of various engine conditions as desired.

The ammonia regeneration module 130 is configured to compare one or more of the alternator operating condition, engine operating condition, and ammonia storage level to threshold values, and generate a heater command 140 to heat the solid ammonia source cartridge 68 via the heater 72 based on the comparison. Each of the threshold values may be a predetermined value, a dynamic value, or a combination of predetermined and dynamic values. Predetermined threshold values can be predetermined prior to operation of the engine system 10 and stored in the ammonia regeneration module 130. Dynamic threshold values can be determined by the ammonia regeneration module 130 based on current operating conditions of the engine system 10 and vary according to variances in the engine system operating conditions.

According to one embodiment, the ammonia regeneration module 130 determines an alternator efficiency threshold based on predetermined and/or current operating conditions of the engine system 10. In one embodiment, the alternator efficiency threshold is a relatively high alternator efficiency. For example, in some implementations, the alternator efficiency threshold is between about 60% efficient and about 90% efficient.

According to another embodiment, the ammonia regeneration module 130 determines an alternator load threshold based on predetermined and/or current operating conditions of the engine system 10. In one embodiment, the alternator load threshold is a relatively high alternator load. For example, in some implementations, the alternator load threshold is between about 60% of maximum alternator load and about 90% of maximum alternator load.

The ammonia regeneration module 130 is configured to determine at least one of a low ammonia dosing threshold and a high ammonia dosing threshold based on predetermined and/or current operating conditions of the engine system 10. The low and high ammonia dosing thresholds are associated with respective low and high ammonia dosing quantities since a start-up event, such as the start-up of the engine 20 or start of a solid ammonia regeneration method (e.g., the method 200 described below). Accordingly, the dosing thresholds are met when the monitored quantity of ammonia injected into the exhaust gas stream after a designated start-up event reaches or exceeds the thresholds.

In one embodiment, the low and high ammonia dosing thresholds are determined at or following the start-up event and are based on the determined ammonia storage level of the dosing cartridge 70 at the start-up event. The high dosing threshold can be associated with a minimum acceptable ammonia storage level of the dosing cartridge 70, which in certain implementations can be between about 10% and about 30%. The low dosing threshold can be associated with a maximum acceptable regeneration ammonia storage level of the dosing cartridge 70, which in certain implementations can be between about 30% and about 70%. The maximum acceptable regeneration ammonia storage level can be based on various factors, such as a desired maximum frequency rate of ammonia regeneration. In some implementations, the low ammonia dosing threshold is between about 25% and about 75% lower than the high ammonia dosing threshold.

Figure 3:
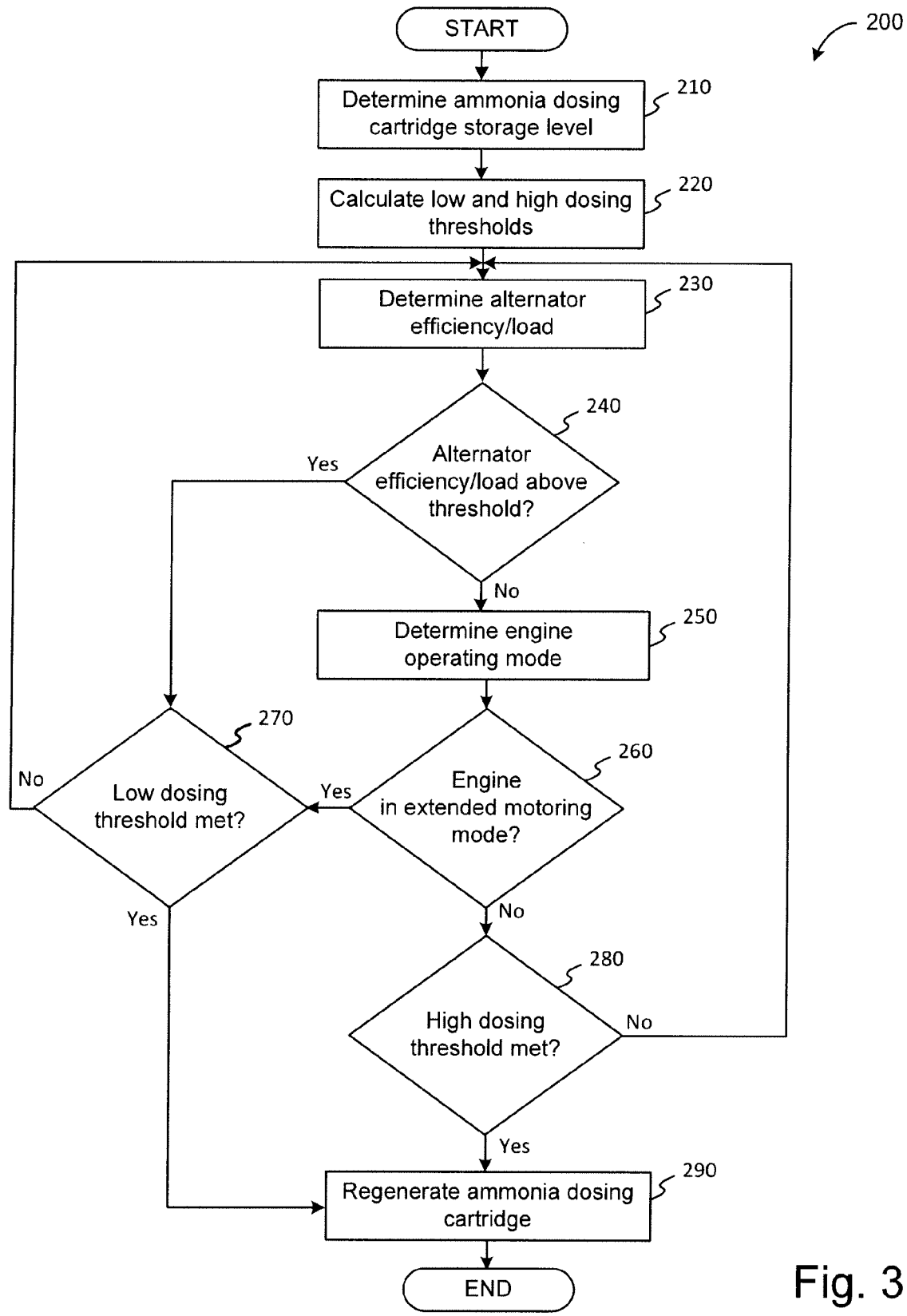
FIG. 3 is a schematic flow chart according to one embodiment of the present disclosure.

Referring to FIG. 3, according to one example embodiment, a method 200 for regenerating an ammonia dosing cartridge is shown. In some implementations, the controller 80, and associated modules 100-130, are configured to execute the method 200. The method 200 begins by determining the ammonia storage level of a solid ammonia dosing cartridge at 210, which can be accomplished using any of various techniques as described above. Additionally, the method 200 determines or calculates low and high ammonia dosing thresholds at 220, which can be associated with high and low ammonia storage levels, respectively, of the dosing cartridge.

The method 200 executes one or both of steps 230, 250. According to step 230, the method 200 determines at least one of a current efficiency and load of the alternator. If the one of the current alternator efficiency meets (e.g., is above) an alternator efficiency threshold, and the current alternator load meets (e.g., is above) an alternator load threshold, at 240, then the method 200 proceeds to determine if the low dosing threshold has been met at 270. According to one implementation, step 240 of the method 200 only determines if the current alternator efficiency meets the alternator efficiency threshold, without considering the alternator load. Alternatively, according to another implementation, step 240 of the method 200 only determines if the current alternator load meets the alternator load threshold, without considering the alternator efficiency. In yet other implementations, step 240 of the method 200 determines if either or both of the current alternator load meets the alternator load threshold and the current alternator efficiency meets the alternator efficiency threshold.

Should the condition of step 240 not be satisfied, the method 200 proceeds to determine the operating mode of the engine at 250. If the engine is being operated in an extended motoring mode as described above, the method 200 proceeds to determine if the low dosing threshold has been met at 270. Otherwise, the method 200 proceeds to determine if the high dosing threshold has been met at 280.

According to some implementations, the order of steps 230, 250 shown in FIG. 3 can be reversed. For example, steps 250, 260 can be executed before steps 230, 240. Alternatively, the steps 250, 260 can be executed concurrently with steps 230, 240. In some implementations, only steps 230, 240 are executed, while in other implementations, only steps 250, 260 are executed. Further, although steps 230, 240 are associated with a specific operating condition corresponding with an alternator, and steps 250, 260 are associated with a specific operating condition corresponding with an engine operating mode, in other embodiments, these steps can be supplemented or replaced by steps associated with other specific operating conditions corresponding with other components or parameters of the engine system 10.

Referring back to step 270, if the low dosing threshold is not met (e.g., the quantity of injected ammonia has not yet reached the quantity associated with the low dosing threshold), then the method 200 returns to one of steps 230, 250. However, if the low dosing threshold is met at 270, then the method 200 proceeds to regenerate the ammonia dosing cartridge at 290 by heating a solid ammonia source cartridge (e.g., in response to a heater command). Similarly, referring back to step 280, if the high dosing threshold is not met (e.g., the quantity of injected ammonia has not yet reached the quantity associated with the high dosing threshold), then the method 200 returns to one of steps 230, 250. However, if the high dosing threshold is met at 280, then the method 200 proceeds to regenerate the ammonia dosing cartridge at 290 by heating a solid ammonia source cartridge.

Because the low dosing threshold is lower than the high dosing threshold, less ammonia is required to be dosed or released form the dosing cartridge to meet the low dosing threshold compared to the high dosing threshold. Accordingly, the method 200 is configured to regenerate the ammonia dosing cartridge sooner if the operating conditions associated with steps 230, 250 meet the corresponding thresholds at steps 240, 260, respectively, than if the thresholds have not been met. Because the operating conditions correspond generally to the electrical efficiency and power consumption of the engine system 10, the method 200 is tailored to regenerate the dosing cartridge sooner if regenerating sooner will take advantage of an engine system operational environment more conducive to ammonia regeneration (e.g., at times and during conditions that will mitigate electrical efficiency losses and reduce power consumption).

The described features, structures, advantages, and/or characteristics of the subject matter of the present disclosure may be combined in any suitable manner in one or more embodiments and/or implementations. In the above description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the above description and appended claims, or may be learned by the practice of the subject matter as set forth above.

The schematic flow chart diagrams and method schematic diagrams described above are generally set forth as logical flow chart diagrams. As such, the depicted order and labeled steps are indicative of representative embodiments. Other steps, orderings and methods may be conceived that are equivalent in function, logic, or effect to one or more steps, or portions thereof, of the methods illustrated in the schematic diagrams.

Additionally, the format and symbols employed are provided to explain the logical steps of the schematic diagrams and are understood not to limit the scope of the methods illustrated by the diagrams. Although various arrow types and line types may be employed in the schematic diagrams, they are understood not to limit the scope of the corresponding methods. Indeed, some arrows or other connectors may be used to indicate only the logical flow of a method. For instance, an arrow may indicate a waiting or monitoring period of unspecified duration between enumerated steps of a depicted method. Additionally, the order in which a particular method occurs may or may not strictly adhere to the order of the corresponding steps shown.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fiber cable, Radio Frequency (RF), or the like, or any suitable combination of the foregoing In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In certain embodiments, the modules of the apparatus described herein may each include at least one of logic hardware and executable code, the executable code being stored on one or more memory devices. The executable code may be replaced with a computer processor and computer-readable storage medium that stores executable code executed by the processor.

In the above description, certain terms may be used such as "up," "down," "upper," "lower," "horizontal," "vertical," "left," "right," and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

The present subject matter may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An ammonia generation control system, comprising:
   a solid ammonia source;
   a controller, including a processor and non-transitory computer-readable storage media, comprising:
      a communication module; and
      an ammonia generation module coupled to the communication module, the ammonia generation module configured to cause generation of gaseous ammonia from the solid ammonia source in response to a determination that:
         A) an ammonia storage quantity in an ammonia dosing storage cartridge meets a first pre-determined threshold, and
         B) an engine condition of an internal combustion engine coupled to the ammonia dosing storage cartridge meets a pre-determined engine condition threshold; and
   a sensor electrically coupled to the ammonia generation module, the sensor configured to detect an alternator operating condition, the engine condition threshold relating to the alternator operating condition.

2. The ammonia generation control system according to claim 1, wherein the ammonia generation module is configured to cause generation of gaseous ammonia by causing transmission of a heater control command.

3. The ammonia generation control system according to claim 1, further comprising a sensor electrically coupled to the ammonia generation module, the sensor configured to detect the ammonia storage quantity.

4. The ammonia generation control system according to claim 3, wherein the sensor detects the ammonia storage quantity by detecting a quantity of ammonia dispersed from the ammonia dosing storage cartridge.

5. The ammonia generation control system according to claim 1, further comprising a heater electrically coupled to the ammonia generation module, the ammonia generation module operable to activate and deactivate the heater for generation of gaseous ammonia from the solid ammonia source.

6. The ammonia generation control system according to claim 1, wherein the solid ammonia source is disposed in the ammonia dosing storage cartridge.

7. The ammonia generation control system according to claim 6, wherein the solid ammonia source is disposed in a secondary ammonia storage cartridge in fluid communication with the ammonia dosing storage cartridge.

8. The ammonia generation control system according to claim 7, further comprising a heater coupled to the secondary ammonia storage cartridge.

9. The ammonia generation control system according to claim 7, further comprising a valve disposed between the ammonia dosing storage cartridge and the secondary ammonia storage cartridge, the ammonia generation module electrically coupled to the valve so as to control the flow of gaseous ammonia from the secondary ammonia storage cartridge to the ammonia dosing storage cartridge.

10. An ammonia generation control system, comprising:
    a solid ammonia source;
    a controller, including a processor and non-transitory computer-readable storage media, comprising:
       a communication module; and an ammonia generation module coupled to the communication module, the ammonia generation module configured to cause generation of gaseous ammonia from the solid ammonia source in response to a determination that:
  A) an ammonia storage quantity in the ammonia dosing storage cartridge meets a first pre-determined threshold, and
  B) an engine condition of an internal combustion engine coupled to the ammonia dosing storage cartridge meets a pre-determined engine condition threshold; and
a sensor electrically coupled to the ammonia generation module, the sensor configured to detect the engine condition threshold,
wherein the engine condition threshold includes an efficiency level of an alternator.

11. An ammonia generation system, comprising:
at least one ammonia storage cartridge including a solid ammonia source disposed therein, the at least one ammonia storage cartridge including at least one heater coupled thereto, and the at least one ammonia storage cartridge including at least one of an ammonia dosing storage cartridge and a secondary ammonia storage cartridge; and
a controller, including a processor and non-transitory computer-readable storage media, comprising:
  an ammonia generation module electrically coupled to the at least one heater, the ammonia generation module configured to cause generation of gaseous ammonia from the solid ammonia source by activation of the at least one heater in response to a determination that:
    A) an ammonia storage quantity in the ammonia dosing storage cartridge meets a first pre-determined threshold, and
    B) an engine condition of an internal combustion engine coupled to ammonia dosing storage cartridge meets a pre-determined engine condition threshold,
  wherein the engine condition threshold includes an efficiency level of an alternator coupled to the internal combustion engine.

12. The ammonia generation system according to claim 11, wherein the solid ammonia source is disposed in the secondary ammonia storage cartridge, and the secondary ammonia storage cartridge is in fluid communication with the ammonia dosing storage cartridge.

13. The ammonia generation system according to claim 11, wherein the solid ammonia source is disposed in the ammonia dosing storage cartridge.

14. The ammonia generation system according to claim 11, further comprising a sensor electrically coupled to the ammonia generation module, the sensor configured to detect the engine condition threshold.

15. A method of controlling ammonia generation, the method comprising:
  receiving, by an ammonia generation module of a controller, a first determination that an ammonia storage quantity has a reached a first pre-determined threshold;
  receiving, by the ammonia generation module, a second determination that an engine condition of an internal combustion engine coupled to an ammonia dosing storage cartridge meets a pre-determined engine condition threshold; and
  causing, via the ammonia generation module, generation of gaseous ammonia from a solid ammonia source in response to the receipt of the first and second determinations,
  wherein the ammonia generation module receives the second determination from a second sensor, the second sensor configured to detect the efficiency level of an alternator coupled to the internal combustion engine.

16. The method of controlling ammonia generation according to claim 15, wherein causing the generation of gaseous ammonia includes transmitting a heater control command to a heater coupled to the solid ammonia source.

17. The method of controlling ammonia generation according to claim 15, wherein the ammonia generation module receives the first determination from a first sensor electrically coupled to the ammonia generation module, the first sensor configured to detect the ammonia storage quantity.

18. The method of controlling ammonia generation according to claim 15, wherein the solid ammonia source is disposed in a secondary ammonia storage cartridge in fluid communication with the ammonia dosing storage cartridge.

* * * * *